United States Patent
Turung (10) Patent No.: US 7,693,614 B2
(45) Date of Patent: Apr. 6, 2010

(54) AIRPLANE EMERGENCY NAVIGATIONAL SYSTEM

(75) Inventor: Brian E. Turung, 600 Buckhead Ct., Avon Lake, OH (US) 44012

(73) Assignee: Brian E. Turung, Avon Lake, OH (US)

( * ) Notice: Subject to any disclaimer, the term of this patent is extended or adjusted under 35 U.S.C. 154(b) by 1251 days.

(21) Appl. No.: 10/799,980

(22) Filed: Mar. 12, 2004

(65) Prior Publication Data

US 2005/0216138 A1     Sep. 29, 2005

Related U.S. Application Data (63) Continuation of application No. PCT/US02/28617, filed on Sep. 10, 2002.

(60) Provisional application No. 60/322,184, filed on Sep. 13, 2001.

(51) Int. Cl.
    *G01C 23/00* (2006.01)
(52) U.S. Cl. ............... 701/3; 701/9; 701/11; 701/301; 244/76 R; 244/175; 244/189
(58) Field of Classification Search ...................... 701/3, 701/9, 11, 213, 301; 244/76 R, 175, 189
    See application file for complete search history.

(56) References Cited

U.S. PATENT DOCUMENTS

| | | | | | |
|---|---|---|---|---|---|
| 3,945,593 | A | * | 3/1976 | Schanzer | 244/181 |
| 4,924,401 | A | * | 5/1990 | Bice et al. | 701/6 |
| 5,031,102 | A | * | 7/1991 | Robbins et al. | 701/5 |
| 5,803,408 | A | * | 9/1998 | Gast | 244/178 |
| 5,884,870 | A | * | 3/1999 | Maffre et al. | 244/182 |
| 6,092,007 | A | * | 7/2000 | Cotton et al. | 701/4 |
| 6,163,744 | A | * | 12/2000 | Onken et al. | 701/3 |
| 6,225,890 | B1 | * | 5/2001 | Murphy | 340/426.19 |
| 6,259,976 | B1 | * | 7/2001 | Lemelson et al. | 701/3 |
| 6,345,232 | B1 | * | 2/2002 | Lynch et al. | 701/214 |
| 6,641,087 | B1 | * | 11/2003 | Nelson | 244/118.5 |
| 6,675,076 | B1 | * | 1/2004 | Moody | 701/11 |
| 6,819,266 | B2 | * | 11/2004 | Greene | 340/969 |
| 2003/0135327 | A1 | * | 7/2003 | Levine et al. | 701/220 |

* cited by examiner

*Primary Examiner*—Thomas G. Black
*Assistant Examiner*—Brian J Broadhead
(74) *Attorney, Agent, or Firm*—Fay Sharpe LLP (57) ABSTRACT

An emergency navigational system that monitors the navigation of an aircraft by comparing actual flight parameter data to predefined flight parameter data to thereby determine if the actual flight parameter data deviates beyond a defined value, and if so, activating a navigational controller to at least partially control the navigation of the aircraft.

42 Claims, 4 Drawing Sheets

AIRPLANE EMERGENCY NAVIGATIONAL SYSTEM

This patent application is a continuation of co-pending PCT Patent Application No. PCT/US02/28617 filed Sep. 10, 2002, entitled "Airplane Emergency Navigational System", which in turn claims priority on U.S. Provisional Application Ser. No. 60/322,184 filed Sep. 13, 2001, entitled "Airplane Emergency Navigational System".

The present invention pertains to aircraft, and more particularly to emergency navigational systems for aircraft.

INCORPORATION BY REFERENCE

U.S. Pat. Nos. 6,443,399; 6,430,480; 6,405,107; 6,259,976; 6,201,482; 6,182,005; 6,178,363; 6,064,939; 6,041,273; 6,002,347; and 5,157,615; and United States Patent Publication Nos. US 2002/0080059 A1; US 2002/0069019 A1; and US 2002/0002428 A1 are incorporated by reference to illustrate various collision avoidance systems, warning systems, guidance and navigational systems, and data informational systems that can be interfaced with and/or incorporated into the present invention. These patents and patent publications also provide background information on the operation of aircraft and standard navigational systems of aircraft, thus such teachings are incorporated herein by reference to form a part of this patent application, and such disclosures and teachings will not be fully repeated herein.

BACKGROUND OF THE INVENTION

Over the past years, aircraft manufacturers have developed many significant safety features on aircraft to increase the passenger safety during a flight, during a standard landing and/or during emergency landings. These features include safety lighting, better seat designs, better aircraft structural designs, inflatable crafts, door locking systems, safety doors, warning beacons, navigational warning sensors, location devices, communication devices and the like. All of these safety features have increased both the comfort and safety of the flight crew and passengers alike. However, several of the safety features in aircraft require experienced personnel to activate the features and/or understand the warnings provided by the feature in order to take the appropriate corrective action. If such experienced personnel are not able to recognize the significance of the warning being provided by the safety feature, unable to operate the safety feature, and/or unable to take corrective action after the safety feature has provided a warning, the safety feature loses it effectiveness to provide the desired safety to the crew and passengers alike. This inability of experienced personnel to notice such warning and/or to take the appropriate corrective action is critical when such warning by the safety equipment relates to the flight path of the aircraft. In such circumstances, the aircraft may crash if corrective action is not taken.

In view of the existing state of aircraft navigational systems, there is a need for a safety system that takes partial or full navigational control of the aircraft in an emergency situation.

SUMMARY OF THE INVENTION

The present invention pertains to aircraft, and more particularly to emergency navigational systems for aircraft. Although the present invention is particularly directed to aircraft, the invention has much broader applications and can be used in other navigational systems that are used in boats (e.g. sailboat, speed boat, ship, ferry, etc.), cars (e.g. automobile, bus, truck, etc.), trains, helicopters, and the like. The present invention is directed to an automated navigational system that at least partially takes navigational control of an aircraft during an actual and/or perceived emergency situation. Such actual and/or perceived emergency situation can include, but are not limited to, hijacking, injured and/or unconscious pilots and/or authorized personnel, adverse weather conditions, close proximity of other aircraft, improper flight path, improper airspeed, improper navigational commands, improper altitude, improper aircraft orientation, advancing projectiles, non-entry of timely data by pilot and/or authorized personnel, damage to the aircraft, failure and/or malfunction of one or more systems on the aircraft (e.g. electrical problems, hydraulic problems, communication problems, etc.); fuel problems (e.g. low fuel, fuel loss, etc.); passenger illness, lost communications with ground control; aircraft damage; and/or the like. When one or more such actual and/or perceived emergency situations are detected by the emergency navigational system, the emergency navigational system will take partial or full navigational control of the aircraft in an attempt to alleviate or overcome the actual and/or perceived emergency situation. For instance, the emergency navigational system can take control of the rudder, the flaps, the landing gear, the engine operation (e.g. engine speed, engine use, etc.), fuel consumption, brakes (e.g. air, mechanical, etc.), fuel distribution (e.g. fuel volume in fuel tanks, etc.) external lights, warning signals, warning beacon, and the like. As can be appreciated, other aircraft controls can be at least partially taken over by the emergency navigational system. As such, the emergency navigational system provides a secondary navigational safety layer in the event that an authorized pilot and/or other authorized personnel cannot perform the required functions in the aircraft, and/or does not perform the required functions within a certain time and/or certain manner.

In one aspect of the present invention, the emergency navigational system is incorporated in the navigational controls of the aircraft. The pilot and/or authorized personnel can partially or fully remove the emergency navigational system from the aircraft at the convenience of the pilot and/or authorized operator. In one embodiment of the invention, the emergency navigational system can be caused to fully or partially take navigational control of the aircraft and/or caused to fully or partially release navigational control of the aircraft by, but not limited to, a switch, key inputted code, key card, electromagnetic signal, computer command, voice command, retina scan, fingerprint scan, and/or the like. In another and/or alternative embodiment of the invention, the emergency navigational system is designed to be partially or fully removed from the navigational controls of the aircraft. Non-limiting examples include removable software programs that form at least a part of the emergency navigational system, removable data that provides at least a part of the needed information to at least partially operate the navigational system, removable hardware that form at least a part of the emergency navigational system and/or the like.

In another and/or alternative aspect of the present invention, the emergency navigational system is incorporated into the navigational controls of the aircraft in a manner that the emergency navigational system cannot be at least partially removed and/or improperly caused to partially or fully gain and/or release navigational control of the aircraft without damaging the navigational controls of the aircraft. Such a design deters or prevents an individual from tampering with the emergency navigational system. This is a particularly useful design to prevent hijackers or other unauthorized individuals from disabling the emergency navigational system. In one aspect of this embodiment, the attempted removal of the emergency navigational system and/or improper enabling and/or disabling full or partial the navigational control of the aircraft by the emergency navigational system constitutes an actual emergency situation resulting in the activation of the emergency navigational system.

In still another and/or alternative aspect of the present invention, at least a portion of the emergency navigational system is located in a portion of the aircraft that is remote to the cockpit of the aircraft. The positioning of at least a portion of the emergency navigational system in a remote location reduces or prevents an unauthorized individual from easily enabling and/or disabling the emergency navigational system. In one embodiment of the invention, the portion of the emergency navigational system that is in a remote location from the cockpit has sufficient components and/or data to at least partially control the aircraft when an emergency situation is detected by the emergency navigational system to cause the partial or full control or releasing of navigational control by the emergency navigational system. In one aspect of this embodiment, the aircraft includes an emergency navigational system that comprises a primary emergency navigational system primarily located in the cockpit of the aircraft and a secondary emergency navigational system primarily located in one or more locations remote to the cockpit. If for some reason the primary emergency navigational system is damaged and/or improperly disabled, the secondary emergency navigational system can at least partially control the aircraft. As can be appreciated, more than one secondary emergency navigational system can be incorporated in the aircraft. In another and/or alternative embodiment of the invention, at least a portion of the secondary emergency navigational system is located in a secure location that is remote to the cockpit to reduce or prevent unauthorized tampering and/or disabling the secondary emergency navigational system.

In yet another and/or alternative aspect of the present invention, there is provided an emergency navigational system that at least partially takes navigational control of the aircraft when the emergency navigational system detects and/or receives information pertaining to one or more actual or perceived emergency situations. In one embodiment of the invention, the emergency navigational system is at least partially incorporated into the navigational controls of the aircraft and is designed to detect information in and/or about the aircraft and/or receive information from remote locations to determine whether an aircraft is involved in one or more actual and/or perceived emergency situations. The existing features of the aircraft (e.g. navigational systems, monitors, sensors, etc.) can be used by the emergency navigational system to assist in determining the existence of an emergency situation. As can be appreciated, the emergency navigational system can use its own sensors, monitors, etc. to assist in determining the existence of an emergency situation. In another and/or alternative embodiment of the invention, the emergency navigational system, upon detection and/or upon receiving information of an actual or perceived emergency situation, at least takes partial navigational control of the aircraft to cause the aircraft to execute one or more corrective actions and/or predetermined actions in response to the one or more actual and/or perceived emergency situations. In one aspect of this embodiment, the emergency navigational system releases control back to the pilot and/or other authorized personnel after the aircraft has reentered the proper flight path, reobtained the proper airspeed, reobtained the proper orientation, and/or reobtained the proper altitude. In one particular design, the emergency navigational system immediately, or after a certain time period, releases control to the pilot and/or other authorized personnel after the aircraft has reentered the flight path, reobtained the proper airspeed, reobtained the proper orientation, and/or reobtained the proper altitude. In another and/or alternative particular design, the emergency navigational system releases control to the pilot and/or other authorized personnel after the aircraft has reentered the flight path, reobtained the proper airspeed, reobtained the proper orientation, and/or reobtained the proper altitude; and after the pilot and/or other authorized personnel performs a reinitiating function such as, but not limited to, activating a switch, entering a code, using a key, entering a key card, providing a voice command, providing a retina scan, providing a fingerprint scan, and the like. In still another and/or alternative particular design, the emergency navigational system releases control to the pilot and/or other authorized personnel after the emergency navigational system receives a remote signal such as, but not limited to, a signal from another aircraft, a ground signal from ground control, a satellite signal, and the like. In these particular non-limiting designs, the aircraft is maintained under at least partial navigational control by the emergency navigational system in the event that the detected deviation in flight path, airspeed, orientation, and/or altitude was caused by an injury to the pilot, a hijacking and/or the like. For instance, if the aircraft is hijacked, the emergency navigational system would prevent the hijacker from maintaining navigational control of the aircraft shortly after the hijacker has caused the aircraft to deviate from the proper flight path, proper airspeed, proper aircraft orientation, and/or proper altitude of the aircraft. In still another and/or alternative embodiment of the invention, the pilot and/or authorized personnel are able to regain full or partial navigational control from the emergency navigational system. In some situations, a malfunction or damage may occur to the aircraft, wherein the emergency navigational system cannot correct automatically. In such situations, the pilot and/or authorized personnel may want to fully or partially regain navigational control from the emergency navigational system and attempt to again manually control the aircraft. In still another and/or alternative embodiment of the invention, the emergency navigational system can be designed so that it cannot be caused to release control to a pilot and/or other authorized personnel unilaterally by the pilot and/or other authorized personnel. Non-limiting examples include (a) the emergency navigational system requires a remote signal to be sent to the emergency navigational system to cause or begin the partial or complete release of the navigational controls of the aircraft from the emergency navigational system to the pilot and/or other authorized personnel; or (b) the emergency navigational system requires a remote signal to be sent to the emergency navigational system in addition to the pilot and/or other authorized personnel performing some reinitiating function (e.g. activating a switch, using a key, key card, entering a code, providing a voice command, providing a retina scan, providing a fingerprint scan, etc.) to cause partial or full release of the navigational control of the aircraft from the emergency navigational system to the pilot and/or other authorized personnel.

In yet another and/or alternative aspect of the present invention, there is provided an emergency navigational system that at least partially takes navigational control of the aircraft when the emergency navigational system detects and/or receives information pertaining to the aircraft deviating from a proper flight path, proper airspeed, proper aircraft orientation, and/or proper altitude. It is not uncommon for an aircraft to deviate from a proper flight path, proper airspeed, proper orientation, and/or proper altitude when the aircraft is damaged, the pilot is injured, when avoiding adverse weather conditions, when avoiding collisions, and/or when the aircraft is hijacked. For instance, when a hijacker takes control of the aircraft, the hijacker may decide to direct the aircraft from its original destination to some other destination. When the hijacker begins directing the aircraft to the new destination, this will result in a deviation from the proper flight path. The redirecting of the aircraft may also result in a deviation in the desired altitude of the aircraft, the desired airspeed of the aircraft and/or the desired orientation of the aircraft. Alternatively, if the hijacker decides to crash the aircraft, the hijacker will typically cause the aircraft to reduce in altitude, cause the aircraft to enter into an uncontrolled spin, execute a turn that is not within the design of the aircraft, stall the aircraft, or the like. When the hijacker attempts to crash the aircraft, this will result in a deviation from the desired altitude and/or orientation of the aircraft. The attempted crash may also result in a deviation from the desired airspeed and/or flight path of the aircraft. When the aircraft deviates from a proper flight path, proper airspeed, proper orientation, and/or proper altitude, the aircraft poses a danger to the passengers on board, a danger to other aircraft and/or a danger to persons on the ground.

In still yet another and/or alternative aspect of the present invention, the emergency navigational system is hardwired and/or programmable such that the proper flight path, proper airspeed, proper aircraft orientation, and/or proper altitude of the aircraft during the flight of the aircraft at least partially exists in or is part of the emergency navigational system. In one embodiment of the invention, the emergency navigational system is preprogramed prior to flight with the data pertaining to the proper flight path, proper airspeed, proper aircraft orientation, and/or proper altitude of the aircraft for at least a portion of the flight of the aircraft. As can be appreciated, other data can be preprogrammed such as, but not limited to, flight number, type of aircraft, passenger information, personnel information, cargo information, airport information, departure times, arrival times, departure location, arrival location, proper cabin pressure during flight, fuel volume, proper cabin temperature during flight, atmospheric conditions, security codes, alternative flight plans, etc. This data entry can be accomplished in several ways. Non-limiting examples include authorized personal manually inputting the data; connecting a data cable to the aircraft while the aircraft is on the ground; authorized personal electronically copying the data into the emergency navigational system and/or inserting a memory device into the emergency navigational system such as, but not limited to, a disk, card, tape, data stick, data chip, or the like, or some other type of key, cartridge, chip, etc. that includes the data; or authorized personal transmitting the data to the aircraft while the aircraft is on the ground and/or in route. In another and/or alternative embodiment of the invention, the emergency navigational system includes one or more circuit boards that include the data pertaining to the proper flight path, proper airspeed, proper aircraft orientation, proper altitude of the aircraft during the flight of the aircraft, and/or other information. In still another and/or alternative embodiment of the invention, the emergency navigational system at least partially receives data pertaining to the proper flight path, proper airspeed, proper aircraft orientation, proper altitude of the aircraft, and/or other information during the flight of the aircraft from authorized personal from a location remote to the aircraft. Non-limiting examples include transmission of data from an airport, transmission of data from another aircraft, transmission of data from an air traffic control center, and/or the like. As can be appreciated in this embodiment, the data pertaining to the proper flight path, proper airspeed, proper aircraft orientation, proper altitude of the aircraft, and/or other information can be partially or fully inputted into the aircraft just prior to, during, or after the aircraft has taken flight. As can be further and/or alternatively appreciated in this embodiment, the data pertaining to the proper flight path, proper airspeed, proper aircraft orientation, proper altitude of the aircraft, and/or other information can be modified in flight to account for weather conditions, air traffic, traffic control failures, damage to and/or malfunctions of the aircraft, emergency landings, and/or the like. As such, the aircraft can be navigated into a new flight path, airspeed and/or altitude without causing the emergency navigational system to at least partially gain navigational control of the aircraft.

In still another and/or alternative embodiment, the data transmitted to the emergency navigational system is encoded or otherwise secured to prevent unauthorized transmissions to alter and/or corrupt the data in the emergency navigational system. The data transmitted to the aircraft from one or more locations remote to the aircraft is secured to prevent unauthorized transmissions from affecting the data in the emergency navigational system. In one embodiment of the invention, the data is encoded with a specific key that is recognized by the emergency navigational system thereby resulting in the emergency navigational system accepting the transmitted data. In one aspect of this embodiment, the key code can be set in an emergency navigational system for a particular aircraft, for a particular route of the aircraft and/or for a particular time period. In another and/or alternative aspect of this embodiment, the key code is changed for every flight of the aircraft. In one specific design of this aspect, when the aircraft is on the ground, the emergency navigational system is programmed with a code and/or a circuit board, chip, card, or the like having a code is entered into the emergency navigational system. When data is transmitted remotely to the aircraft, the emergency navigational system determines if the transmitted data includes a proper code that either matches or is dependent on the code that has been entered into the emergency navigational system. Once the emergency navigational system determines that the transmitted data is authorized data, the emergency navigational system accepts the transmitted data. However, if the transmitted data is deemed to not be authorized data, the emergency navigational system does not accept the transmitted data. As can be appreciated, many other security measures can be used to ensure that the emergency navigational system only accepts authorized data. In another and/or alternative embodiment, the emergency navigational system includes various protections against viruses that could result in the destruction and/or corruption of data. This protection can include, but is not limited to, fire walls, virus scans, extractors, and the like.

In yet another and/or alternative aspect of the present invention, there is provided an emergency navigational system that at least partially takes navigational control of the aircraft when the emergency navigational system determines that the aircraft is deviating from a proper flight path, proper airspeed, proper aircraft orientation, and/or proper altitude. In one embodiment of the invention, during the flight of the aircraft, the emergency navigational system includes and/or has access to data that defines the desired flight path, airspeed, aircraft orientation, and/or altitude of the aircraft during at least a portion of the flight. The emergency navigational system also includes and/or has access to data that defines the acceptable deviation that the aircraft can have from the desired flight path, airspeed, aircraft orientation, and/or altitude of the aircraft during at least a portion of the flight before the emergency navigational system determines that an emergency situation exists. In another and/or alternative embodiment of the invention, during the flight of the aircraft, the emergency navigational system includes and/or has access to data that defines an acceptable range of values that the aircraft can have relating to the flight path, airspeed, aircraft orientation, and/or altitude of the aircraft during at least a portion of the flight before the emergency navigational system determines that an emergency situation exists. For example, if the altitude of the aircraft at a particular point in the flight path is suppose to be 27,000 feet, the range of altitude might range from 26,750-27,250 feet, the maximum deviation might be 250 feet from 27,000 feet, or the maximum percentage deviation might be 1% (i.e. 270 feet). In another and/or alternative example, the aircraft at a particular point in a flight path has a particular GPS coordinate, and the maximum deviation from the particular GPS coordinate may be set at 10 miles or at some percentage deviation from the particular GPS coordinate. In still another and/or alternative embodiment, the size of the acceptable range of values, the amount of acceptable deviation, and/or the percentage of acceptable deviation can be a set range or amount of deviation, or a variable range or amount of deviation that depends on one or more variables (e.g. the type of deviation, the location of the aircraft, the type of aircraft, etc.). In one aspect of this embodiment, each type of deviation has a set range or amount of deviation throughout the flight path of the aircraft. For example, the set amount of deviation for the altitude of the aircraft from the desired altitude at different points in the flight path could be 50 feet, or some other value. In another and/or alternative example, the set amount of deviation for the flight path of the aircraft from the desired flight path could be one mile, or some other value. In still another and/or alternative example, the set amount of deviation for the flight speed of the aircraft from the desired flight speed at different points in the flight path could be 30 mph, or some other value. In another and/or alternative aspect of this embodiment, at least one type of deviation has a variable range or amount of deviation throughout the flight path of the aircraft. For example, the amount of deviation for the altitude of the aircraft from the desired altitude at different points in the flight path could be 10 feet when the aircraft has just taken off or is landing and 30 feet when the aircraft has reached cruising altitude. As can be appreciated, other values can be used and also additional values at different points in the flight path can be used. In another and/or alternative example, the variable range or amount of deviation information can be calculated from a formula that takes in account one or more variables measured, detected, etc. during the flight, and/or can be obtained from a database of information that provides data for each leg or a portion of each leg of the flight path of the aircraft and the acceptable deviation of one or more parameters at each leg of the flight path. With respect to the flight path of the aircraft, the acceptable flight path of the aircraft can be visualized as a three-dimensional section of airspace (e.g. a cylinder or other shape) that extends from one point in the sky to another point in the sky. This three-dimensional section can have a constant cross-sectional shape or area, or can have one or more regions that vary in cross-sectional shape and/or area.

In still yet another and/or alternative aspect of the present invention, the emergency navigational system will activate immediately or at some predefined time period after the emergency navigational system determines that an emergency situation exists. In one embodiment of the invention, the emergency navigational system activates immediately after the emergency navigational system determines that an emergency situation exists. In another and/or alternative embodiment of the invention, the emergency navigational system activates at a time after the emergency navigational system determines that an emergency situation exists. This time period of delay for activation of the emergency navigational system can be a set time or a time that is different and/or variable depending on the type of deviation, location of the aircraft, type of aircraft, etc. In one aspect of this embodiment, the time period is a set time period for any type of deviation. In one particular design, the set time period should be relatively short (i.e. typically less than about 5 minutes, more typically less than about 2 minutes, even more typically less than about 1 minute, and still even more typically less than about 30 seconds). In another and/or alternative aspect of this embodiment, the time period is a set time for a particular deviation. In one particular non-limiting design, the time period is 2 minutes for deviations in altitude, 5 minutes for deviations in flight path, 5 seconds for deviations in aircraft orientation, and 3 minutes for deviations in airspeed. As can be appreciated other time limits can be selected. In another and/or alternative aspect of this embodiment, the time period is variable for a particular deviation depending on the type of deviation, the location of the aircraft in the sky, the type of aircraft, etc. In one particular design, the time period for deviations in altitude will vary depending on the altitude of the aircraft, the location of the aircraft, and/or the location of the aircraft within the flight path; the time period of airspeed deviation will vary depending on the present airspeed of the aircraft; and/or the time period of aircraft orientation deviation will depend on the present orientation of the aircraft. As can be appreciated, these time periods of deviation can depend on other and/or additional variables. For example, the time period for deviation for altitude may be greater when the aircraft is at its cruising altitude than when the aircraft has just taken off or is about to land. In another and/or alternative example, the time period for deviation for flight path may be greater when the aircraft is at cruising altitude and over a large body of water than when the aircraft has just taken off or is about to land. In still another and/or alternative example, the time period for deviation of airspeed may be greater when the aircraft is at cruising altitude and cruising speed than when the aircraft has just taken off or is about to land. In yet another and/or alternative example, the time period for deviation in aircraft orientation may be greater when the aircraft is flying straight and level than when the aircraft is turning. As can be appreciated, the time periods can be dependent on additional and/or other parameters. In yet another and/or alternative embodiment of the invention, the emergency navigational system provides one or more warnings to the pilot or authorized personnel prior to the emergency navigational system being activated. The warning allows the pilot to correct the deviation from the desired flight path, aircraft orientation, airspeed, and/or altitude prior to the emergency navigational system taking full or partial navigational control of the aircraft. The warning can be a visual or audible warning. In still yet another and/or alternative embodiment of the invention, the emergency navigational system provides one or more warnings at the time or just prior to the time the emergency navigational system takes partial or full navigational control of the aircraft.

In still another and/or alternative aspect of the present invention, there is provided an emergency navigational system that at least partially takes navigational control of the aircraft and causes the aircraft to enter into a proper or new flight path, airspeed and/or altitude when the emergency navigational system detects and/or receives information (a) pertaining to the aircraft deviating from a proper flight path, proper airspeed, proper aircraft orientation, and/or proper altitude; (b) that timely data has not been transmitted to the aircraft; and/or (c) that timely information has not been inputted by the pilot or other authorized personnel. When the pilot is injured, the aircraft is damaged, the aircraft malfunctions, and/or the aircraft is hijacked, the aircraft typically deviates from one or more desired flight parameters; timely data is not transmitted from and/or received by the aircraft; and/or timely data is not inputted by the pilot or authorized personnel during the course of the flight. For instance, the emergency navigational system can be designed so as to require a pilot or other authorized personnel to periodically enter a code or other data, push a button, check in with a control tower, etc. during the flight. If the pilot and/or authorized personnel were injured or otherwise unable to complete such event (e.g. during a hijacking), the emergency navigational system would take partial or full navigational control of the aircraft. As such, one or more of these situations result in the emergency navigational system at least partially taking navigational control of the aircraft. In one embodiment of the invention, when the emergency navigational system at least partially takes control of the aircraft, the emergency navigational system initially attempts to correct the deviation and subsequently maintain the desired flight path, airspeed, aircraft orientation, and/or altitude of the aircraft based upon the predefined data. In another and/or alternative embodiment of the invention, after a certain time period has passed and the emergency navigational system has not partially or fully released navigational control to the pilot or other authorized personnel, the emergency navigational system causes the aircraft to enter into a new predefined flight path, airspeed and/or altitude; or a flight path, airspeed and/or altitude that has been remotely transmitted to the aircraft. In another and/or alternative embodiment of the invention, the emergency navigational system immediately causes the aircraft to enter into a new predefined flight path. One non-limiting example of a new predefined flight is a flight path that causes the aircraft to reduce in altitude and airspeed. The new predefined flight path can depend on the type of aircraft, location of the aircraft prior to beginning the predefined flight path, etc. The predefined flight path can also result in a new airspeed, new altitude, etc. The new predefined flight path can be a sophisticated or simple flight path. In one aspect of this embodiment, the new predefined flight path results in the aircraft entering into a holding pattern. In one non-limiting example of this aspect, the aircraft enters into a holding pattern (e.g. circular, oval, etc.) and reduces airspeed and/or altitude. In another aspect of this embodiment, the new predefined flight path provides information for the emergency navigational system to direct the aircraft to a particular location that typically is dependent on the location of the aircraft at the time the emergency navigational system at least partially took navigational control of the aircraft (e.g. remote military base, remote airfield, non-populated area, etc.). In one non-limiting example, after the aircraft has reached the final destination of the new predefined flight path, the aircraft enters into a holding pattern. As can be appreciated, many other new predefined flight paths can be used. As can be further appreciated, the new predefined flight path can be designed to minimize risk and/or damage to life and/or property if such flight path directs the aircraft to a remote and/or unpopulated area. Such a new predefined flight path can also enable authorities to intercept the aircraft and/or mobilize at or near a location to the aircraft to adequately deal with the emergency situation of the aircraft. At such time, the emergency navigational system can be remotely given new instructions to cause the aircraft to allow the pilot and/or other authorized personnel to land the aircraft, or to allow the aircraft to be directed to another destination. In a further and/or alternative embodiment of the invention, the emergency navigational system causes the aircraft to fly to a location that is at least partially defined from data received by the emergency navigational system from a location remote to the aircraft. Accordingly, the aircraft can be remotely navigated to other locations and/or caused to land. In still a further and/or alternative embodiment of the invention, the aircraft expels fuel immediately or at some time after the emergency navigational system at least partially takes over the navigational control of the aircraft. In one aspect of this embodiment, the amount of fuel expelled is a function of the location of the aircraft in the flight path of the aircraft. For example, soon after the aircraft has taken off, the emergency navigational system, as a result of some type of emergency situation, takes partial or full control of the navigational control of the aircraft and directs the aircraft along a defined flight path and airspeed, and causes a substantial amount of fuel to be released from the aircraft. In this situation, more fuel may be expelled from the aircraft than when the aircraft has been in flight for a period of time or is over an ocean, etc.

In still another and/or alternative aspect of the present invention, there is provided an emergency navigational system that transmits a signal to indicate that the emergency navigational system has taken full or partial navigational control of the aircraft, has fully or partially released navigational control of the aircraft, is damaged or malfunctioning, etc. In one embodiment of the invention, every warning by the emergency navigational system and/or every instance the emergency navigational system takes partial or full navigational control of the aircraft, a signal is transmitted to a remote location such as, but not limited to, an airport, air traffic control location, and the like. Such transmission provides notification to personnel on the ground of a potential problem associated with the aircraft. In another and/or alternative embodiment of the invention, the emergency navigational system sends positioning information to a remote location when the emergency navigational system at least partially controls the navigation of the aircraft. The location information can include airspeed, latitudinal, longitudinal and/or altitude data (e.g. GPS information, LAN information, etc.), or some other type of information. This location information can be used to generally or very precisely locate the position of the aircraft. In one aspect of the embodiment, the transmission of the location data from the emergency navigational system cannot be terminated until the aircraft has landed and/or after the emergency navigational system has fully or partially released navigational control of the aircraft. In this design, an unauthorized person such as a hijacker is unable to prevent transmission of location information to a remote location once the emergency navigational system has taken partial or full navigational control of the aircraft. This enables ground authorities and/or air controllers to track the movement of the aircraft. In another and/or alternative aspect of this embodiment, the emergency navigational system transmits real time data to a location remote to the aircraft to provide real time data to authorized third parties. Such real time data can include information in addition to flight speed, altitude, and/or location data of the aircraft. In another and/or alternative embodiment of the invention, the emergency navigational system transmits a warning signal to other aircraft in the surrounding area to notify such aircraft that the emergency navigational system of an aircraft has taken full or partial navigational control of the aircraft. Such warning signal allows other aircraft in the general vicinity to take appropriate action (e.g. alter flight path, become more alert, etc.).

In yet another and/or alternative aspect of the present invention, the emergency navigational system secures one or more facilities on the aircraft to reduce or prevent harm to the aircraft when the emergency navigational system takes partial or full navigational control of the aircraft. In one embodiment of the invention, the emergency navigational system reduces the ease of opening doors and/or hatches of the aircraft. As such, access to certain regions of the aircraft can be limited to reduce or prevent sabotage. In addition, doors cannot be easily opened so as to attempt to crash the aircraft. In another and/or alternative embodiment of the invention, when the emergency navigational system takes full or partial navigational control of the aircraft, the emergency navigational system also takes at least partial control of the landing gear, aircraft elevators, aircraft lights, kitchen appliances, environmental conditions, water pressure, fuel systems, and/or the like. As such, unauthorized personnel are deterred from improperly manipulating the proper operation of the aircraft. In still another and/or alternative embodiment of the invention, when the emergency navigational system takes full or partial navigational control of the aircraft, the emergency navigational system at least partially limits communications on the aircraft in the cockpit and/or in the passenger compartment. As such, communications can be limited to only certain personnel on the ground and/or in other authorized aircraft. As can be appreciated, communications can be limited in other manners.

In still another and/or alternative aspect of the present invention, there is provided an emergency navigational system that includes one or more backup or redundant systems. The backup or redundant systems are used to ensure that the primary system is properly functioning and/or to provide an alternative emergency navigational system when the primary system malfunctions and/or is damaged. For instance, if the cockpit area of the aircraft is damaged during flight due to an accident, hijacking or the like, the primary emergency navigational system can be damaged or disabled. In such a situation, the backup or redundant systems partially or fully take over the functions of the primary emergency navigational system. The backup or redundant systems can be designed to take over all functions of the primary emergency navigational system or can be designed to take over or perform only certain functions of the primary emergency navigational system. As such, the backup or redundant systems can be as sophisticated, or less sophisticated, than the primary emergency navigational system. In another and/or alternative embodiment, the backup or redundant systems will transmit data to a remote location to inform authorities that the backup or redundant systems are partially or fully in control of the navigation of the aircraft.

In still another and/or alternative aspect of the present invention, there is provided an emergency navigational system which can be manually initiated by personnel on board the aircraft and/or initiated from a remote location. In one embodiment of the invention, the pilot and/or other authorized personnel can manually cause the emergency navigational system to gain partial or full navigational control of the aircraft when the pilot and/or other authorized personnel determine and/or believe that an emergency situation exists. In one aspect of this embodiment, the cockpit of the aircraft includes a switch to cause the emergency navigational system to gain partial or full navigational control of the aircraft. In another and/or alternative aspect of this embodiment, one or more switches to cause the emergency navigational system to gain partial or full navigational control of the aircraft are located outside the cockpit. As can be appreciated, other mechanisms can be used to cause the emergency navigational system to gain partial or full navigational control of the aircraft (e.g. key, key code, magnetic card, etc.). In another and/or alternative embodiment, the emergency navigational system is caused to gain partial or full navigational control of the aircraft from a remote location with or without the pilot's or other authorized person's knowledge and/or permission. For instance, if ground authorities, flight controllers and/or other authorized aircraft determine that the aircraft poses or potentially poses a safety risk and/or could be involved in another type of emergency situation, the emergency navigational system can be caused to take full or partial navigational control of the aircraft. As can be appreciated, there may be other instances wherein it is advantageous to remotely cause the emergency navigational system to take full or partial navigational control of the aircraft.

In still another and/or alternative aspect of the present invention, there is provided an emergency navigational system which can work in conjunction with one or more other emergency systems. It is not uncommon for aircraft to include various other emergency systems such as, but not limited to, collision avoidance systems, stall warnings, aircraft orientation warnings, airspeed warnings, landing gear warnings, fuel warnings, hydraulic pressure warnings, electrical warnings, fire warnings, pressure warnings, and/or the like. Such emergency systems may only warn the pilot of a potential problem and/or automatically attempt to overcome the problem. One or more of these emergency systems can be integrated with and/or interfaced with the emergency navigational system. In one embodiment of the invention, the collision avoidance system is integrated with and/or interfaced with the emergency navigational system. These two systems are designed to work together to avoid collision with other aircraft, the ground, buildings, and the like. In one aspect of this embodiment, the warning provided by the collision avoidance system results in the emergency navigational system providing a warning and/or causes the emergency navigational system to take partial or full navigational control of the aircraft. In this aspect, the emergency navigational system can be designed to allow the pilot some time to navigate the aircraft out of harm's way before the emergency navigational system takes partial or full navigational control of the aircraft to cause the aircraft to move out of harm's way. Alternatively, the emergency navigational system can be designed immediately to take partial or full navigational control of the aircraft to navigate the aircraft out of harm's way.

It is the principal object of the present invention to provide an emergency navigational system that improves the safety of an aircraft.

It is another and/or alternative object of the present invention to provide an emergency navigational system that at least partially prevents unauthorized operators from navigating an aircraft.

It is yet another and/or alternative object of the present invention to provide an emergency navigational system that monitors and/or controls one or more parameters of an aircraft during the flight of the aircraft.

It is still another and/or alternative object of the present invention to provide an emergency navigational system that navigates an aircraft into a defined flight path after the emergency navigational system has taken partial or full navigational control of the aircraft.

It is a further and/or alternative object of the present invention to provide an emergency navigational system that works in conjunction with one or more other emergency systems on an aircraft.

It is still a further and/or alternative object of the present invention to provide an emergency navigational system that transmits location information of an aircraft after the emergency navigational system has taken partial or full navigational control of the aircraft.

It is yet a further and/or alternative object of the present invention to provide an emergency navigational system that can be manually and/or remotely caused to take full or partial navigational control of an aircraft.

It is yet a further and/or alternative object of the present invention to provide an emergency navigational system that can be manually and/or remotely caused to fully or partially release navigational control of an aircraft.

It is another and/or alternative object of the present invention to provide an emergency navigational system that can be loaded with data while the aircraft is on the ground and/or in flight.

It is still another and/or alternative object of the present invention to provide an emergency navigational system that includes security measures to prevent corruption and/or damage of data in the emergency navigational system.

It is yet another and/or alternative object of the present invention to provide an emergency navigational system that includes security measures to prevent unauthorized access to data and/or control of the emergency navigational system.

It is still yet another and/or alternative object of the present invention to provide an emergency navigational system that includes one or more backup or redundant systems.

It is a further and/or alternative object of the present invention to provide an emergency navigational system that is at least partially removable from an aircraft.

It is still a further and/or alternative object of the present invention to provide an emergency navigational system that cannot be removed from an aircraft.

It is yet a further and/or alternative object of the present invention to provide an emergency navigational system that transmits real time data to a remote location when the emergency navigational system has taken full or partial navigational control of the aircraft.

It is still yet a further and/or alternative object of the present invention to provide an emergency navigational system that at least partially secures the aircraft when the emergency navigational system has taken full or partial navigational control of the aircraft.

These and other objects of the invention will become apparent to those skilled in the art upon reading and understanding the following detailed description of preferred embodiment.

BRIEF DESCRIPTION OF THE DRAWINGS

The invention may take physical form in certain parts and arrangement of parts, preferred embodiment of which will be described in detail and illustrated in the accompanying drawings which form a part hereof and wherein.

DESCRIPTION OF THE PREFERRED EMBODIMENTS

Figure 1:
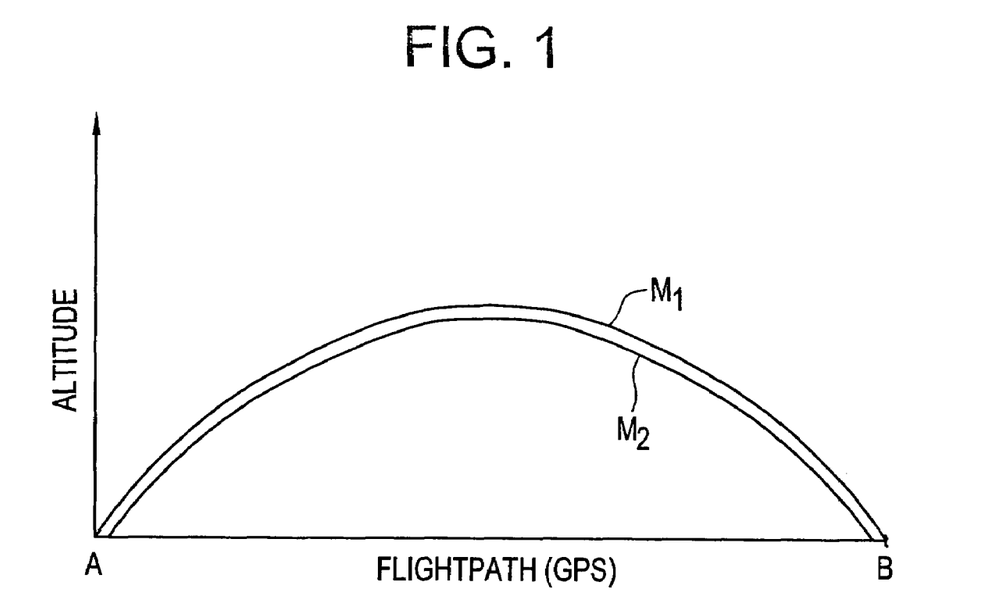
FIG. 1 is a graphical representation of the acceptable altitude deviation of an aircraft.

Referring to the drawings, wherein the showings are for the purpose of illustrating the preferred embodiments of the invention only and not for the purpose of limiting same, FIG. 1 illustrates a predefined flight path of an aircraft from a first destination A to a second destination B. The predefined flight path defines the desired and acceptable flight path of the aircraft from the first to the second destination. This predefined flight path is used by the emergency navigational system to compare the present position of an aircraft to the predefined flight data. The emergency navigational system uses this information to determine whether or not the aircraft has unacceptably deviated from the predefined flight path.

The emergency navigational system is typically incorporated into the navigational systems of the aircraft which are located in the cockpit of the aircraft. As can be appreciated, one or more components of the emergency navigational system can be located in other regions of the aircraft. Typically, the principal components of the emergency navigational system are irremovably incorporated into the navigational system of the aircraft; however, the emergency navigational system can be designed whereby one or more of the principal components of the system can be removed from the aircraft, if such removal is desired.

The basic or principal components of the emergency navigational system include a comparator which can be in the form of a microprocessor or other type of electrical circuit, and/or software program. The comparator is used to compare predefined flight data to flight data that is measured and/or recorded during the flight of the aircraft. Another principal component of the emergency navigational system is a memory component which fully or partially stores the predefined flight data for the aircraft. The memory device can take many forms such as a hard drive, tape drive, DVD, CD, Zip drive, jazz drive, memory stick, and the like. Yet another principle component of the emergency navigational system is a navigational controller which is designed to take full or partial control of one or more navigational systems of an aircraft and/or indirectly take control of one or more navigational systems through existing navigational controls of an aircraft. As can be appreciated, these principal components of the emergency navigational system can be separate components and/or one or more of these components can be incorporated in one or more devices (i.e. microprocessor, electric circuit, software program, etc.).

The emergency navigational system is designed to at least partially take navigational control of an aircraft during an actual or perceived emergency situation. Examples of such emergency situations include, but are not limited to, an aircraft hijacking; injured and/or unconscious pilots, crew, and/or passengers; adverse weather conditions; close proximity of other aircraft; improper flight path; improper airspeed; improper navigational commands; improper altitude; improper aircraft orientation; advancing projectile; non-entry of timely data by pilot and/or authorized personnel; damage to the aircraft; failure and/or malfunction of one or more systems on an aircraft; fuel problems; electrical problems;

hydraulic problems; structural problems; communication problems; pilot, crew, and/or passenger illness; environmental problems; disruptive passengers; and/or any other incident that can cause problems during flight, and/or undesirably alter the flight path of the aircraft. When such an emergency situation occurs, the emergency navigational system is designed to take partial or full navigational control of the aircraft in an attempt to correct for the emergency situation. In effect, the emergency navigational system provides a secondary or backup navigational safety net for the operation of the aircraft during flight in the event that a pilot or other authorized personnel cannot and/or is unable to overcome or avert an emergency situation during the flight of the aircraft.

The emergency navigational system is typically designed such that a pilot and/or other authorized employee using a switch, an inputted code, a key card, an electromagnetic signal, etc. can cause the emergency navigational system to take full or partial navigational control of the aircraft, and/or to release full or partial navigational control of the aircraft back to a pilot and/or other authorized personnel. As can be appreciated, the emergency navigational system can be additionally or alternatively designed to take and/or release full or partial control of an aircraft upon receiving a signal remotely from the aircraft such as, but not limited to, receiving a remote coded signal from a land-based air traffic control facility.

The emergency navigational system is typically designed to take navigational control of the aircraft when an emergency situation is detected by the emergency navigational system. The emergency navigational system can be designed to immediately take control of the aircraft, or take control of the aircraft at some predetermined time after detection by the emergency navigational system to thereby allow a pilot and/or authorized personnel to eliminate or adjust for the emergency situation prior to the emergency navigational system taking navigational control of the aircraft. As can be appreciated, the emergency navigational system can be designed to take only partial navigational control of the aircraft, or be designed to take full navigational control of the aircraft is certain emergency situations, and only partial control of the aircraft in other types of emergency situations. The amount of control taken by the emergency navigational system and/or the timing for taking navigational control of the aircraft by the emergency navigational system will generally depend on the type of aircraft in which the emergency navigational system is installed and/or the level of control which is desired for the emergency navigational system. As can be appreciated, the emergency navigational system can be designed such that the level of control of the aircraft for a particular flight can be customized by the pilot and/or other authorized personnel.

After the emergency navigational system has taken full or partial navigational control of the aircraft, the emergency navigational system can be designed such that it fully or partially releases navigational control once the emergency situation is under reasonable control. In such a design, the emergency navigational system can be caused to fully release or partially release control of the navigation of the aircraft after the pilot and/or authorized personnel activates a switch, enters a code, enters a key card, etc. The emergency navigational system can also be designed such that it will fully or partially release navigational control upon receiving a signal from a location remote to the aircraft, such as but not limited to, a signal from a ground control facility. When the emergency navigational system is designed such that it will fully release navigational control to a pilot and/or other authorized personnel after earlier gaining full or partial navigational control of the aircraft during an actual and/or perceived emergency situation, the full or partial release of navigational control by the emergency navigational system allows a pilot and/or authorized personnel to continue to fly the aircraft as if the earlier emergency situation had never occurred, and the emergency navigational system will not reinitiate full or partial navigational control of the aircraft unless a new emergency situation is later encountered. In instances where the emergency navigational system is designed to only partially release navigational control to a pilot and/or other authorized personnel after it has earlier gained full or partial navigational control of the aircraft, the emergency navigational system can be designed thereafter to closely monitor the flight path of the aircraft and to continue to provide at least partial navigational assistance to the pilot and/or authorized personnel until the aircraft has safely landed and, at which time, the emergency navigational system will release full navigational control of the aircraft. In other situations, the emergency navigational system can be designed such that it will not fully release navigational control to a pilot and/or other authorized personnel on the aircraft once the emergency navigational system has gained full or partial navigational control of the aircraft. In such a design, the emergency navigational system fully or partially controls the navigation of the aircraft until the aircraft has safely landed on the ground. A failsafe system can be incorporated in the emergency navigational system whereby the emergency navigational system can be forced to partially or fully release navigational control of the aircraft upon receiving a signal from a location remote from the aircraft, such as from a land-based aircraft control facility, and/or from a release switch on board the aircraft, if such deactivation is deemed necessary for the continued safe flight of the aircraft. As can be appreciated, the emergency navigational system can be designed to gain and/or release full or partial navigational control of the aircraft in a variety of manners for a variety of reasons, and in view of a variety of different emergency situations. As such, the emergency navigational system can be as versatile and/or as rigid as desired, and the operation of the emergency navigational system can be as versatile and/or as rigid as desired for a particular aircraft.

One non-limiting operation of the emergency navigational system will now be described in detail. The emergency navigational system is designed to compare predefined flight data to monitored and/or determined flight data during the flight of the aircraft, and to determine if the aircraft during flight has unacceptably deviated from the predefined flight data. Upon detection of an unacceptable deviation, the emergency navigational system immediately or at some predefined time after a period of deviation has occurred takes full or partial navigational control of the aircraft. As can be appreciated, the emergency navigational system can take full or partial navigational control of the aircraft for other reasons such as, but not limited to, the pilot and/or authorized personnel not timely entering data, communications between the aircraft and the land-based communications facility being terminated, unexpected loss of fuel, damage to the aircraft, etc. The predefined flight data can include one or more parameters that occur during the flight of the aircraft such as, but not limited to, GPS position of the aircraft, LAN position of the aircraft, airspeed of the aircraft, orientation of the aircraft, altitude of the aircraft, air pressure within the aircraft, temperature within the aircraft, fuel levels of the aircraft, flap and/or rudder position of the aircraft, landing gear status of the aircraft, etc. This predefined flight data is at least partially entered into a database and/or memory of the emergency navigational system prior to the aircraft departing from a particular location. The predefined data can be fully loaded into the aircraft for the complete flight of the aircraft prior to the aircraft leaving a destination, and/or can be partially loaded into the aircraft prior to takeoff and be supplemented at one or more times during the flight of the aircraft. When the aircraft is positioned on a runway and is ready to take off from an airport facility, the monitoring function of the emergency navigational system can be activated, such that the actual flight parameters of the aircraft can be compared to the predefined flight parameters within the database of the emergency navigational system. As can be appreciated, the initial activation of the emergency navigational system can be automatic and/or be activated from a location remote to the aircraft. As the aircraft begins moving during takeoff, the one or more actual flight parameters that are being monitored or determined by the emergency navigational system are compared to the predefined flight parameters to determine if any emergency situation has arisen at any time during the movement or flight of the aircraft. As can be appreciated, the emergency navigational system can be activated at a time prior to the aircraft approaching the runway and/or at some time after the aircraft has taken off from the runway. During the flight of the aircraft, the actual flight parameters of the aircraft can be periodically monitored or constantly monitored, and periodically compared or constantly compared to the predefined flight data in the database and/or memory of the emergency navigational system.

Figure 2:
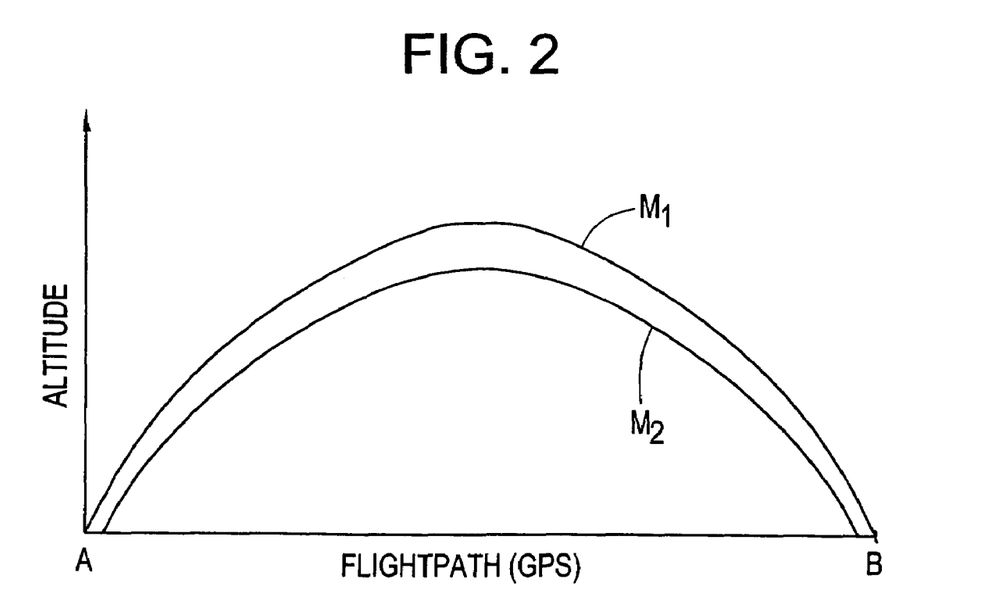
FIG. 2 is a graphical representation similar to FIG. 1, but illustrating that the acceptable altitude deviation varies along the flight path.

Reference is now made to FIG. 1, wherein there is a graphical illustration of the predefined altitude of the aircraft during the flight path of the aircraft from a destination A to a destination B. The arced lines on the graph illustrate the acceptable maximum altitude $M_1$ and minimum altitude $M_2$ of the aircraft during the flight path of the aircraft from destination A to destination B. As illustrated in FIG. 1, the acceptable deviation between the maximum and minimum altitudes of the aircraft in the flight path is substantially constant. As illustrated in FIG. 2, the maximum and minimum predefined altitudes for the flight path of the aircraft from destination A to destination B vary during the flight path of the aircraft. As shown in FIG. 2, the variation between the maximum and minimum altitudes is greatest during the mid-portion of the flight path and narrows when the aircraft has recently taken off from destination A or approaches a landing at destination B. As illustrated in FIGS. 1 and 2, the predefined altitude of the aircraft is correlated to a predefined GPS location. Consequently, during the flight of the aircraft, the actual GPS location of the aircraft is obtained and the altitude at such GPS location is determined or obtained, and such determined or obtained data is correlated with the appropriate predefined flight data to determine if the aircraft is flying at an acceptable or unacceptable altitude at a certain GPS location. As can be appreciated, the altitude data can be correlated to other parameters, such as actual time, time since takeoff, latitude of the aircraft, longitude of the aircraft, LAN location, and/or other parameters.

Figure 3:
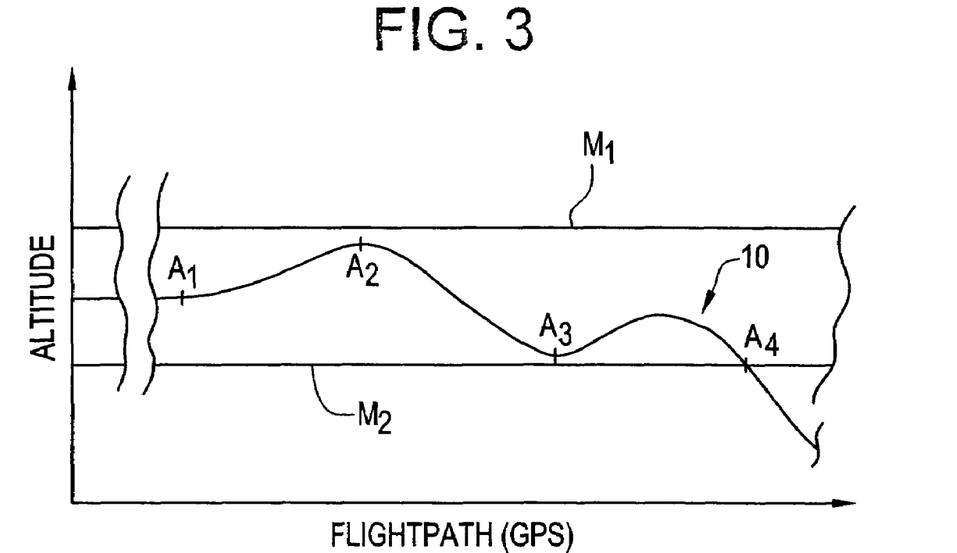
FIG. 3 is a graphical representation of the acceptable altitude deviation during a portion of the flight path of an aircraft, and a representation of the actual altitude of the aircraft in such portion of the flight path.

Referring now to FIG. 3, a graphical representation of the predefined maximum altitude $M_1$ and minimum altitude $M_2$ of an aircraft during a section of the flight path of the aircraft and the actual flight path 10 of the aircraft superimposed on the graph. The maximum and minimum predefined altitudes of the aircraft are shown to be substantially constant during this section of the flight path of the aircraft. This graphical representation would be representative of a section of the altitude parameters of FIG. 1 during the mid-portion of the flight of the aircraft between destination A and destination B. Superimposed between the maximum and minimum predefined altitude parameters is the actual flight path 10 as measured or obtained during the flight of the aircraft. In the beginning part of the graph of FIG. 3, the actual measured altitude $A_1$ of the aircraft is substantially in the middle of the maximum and minimum predefined altitude values, thus the emergency navigational system would not determine that an emergency situation exists with respect to the altitude at this point of the flight path. As the aircraft proceeds in the flight path, the altitude of the aircraft slightly increases $A_2$; however, the actual measured altitude does not exceed the maximum predefined altitude $M_1$. At this point, the emergency navigational system can once again determine that there is no emergency situation, or could designate this situation as a possible warning and/or provide a possible warning signal to the pilot and/or other authorized personnel to indicate to the pilot and/or other authorized personnel that the altitude of the aircraft is approaching the maximum predefined altitude. As the aircraft proceeds in the flight path, the aircraft decreases in altitude $A_3$, and approaches the minimum predefined altitude $M_2$ in the particular flight path. Once again, at this point, the emergency navigational system can determine that no emergency situation exists, or can internally designate this instance as a possible warning and/or provide an actual warning to the pilot and/or authorized personnel that the aircraft is approaching the lower allowable predefined altitude of the aircraft in a particular flight path. As the aircraft proceeds along the flight path, the aircraft initially increases in altitude and subsequently decreases in altitude $A_4$, whereby the aircraft falls below the minimum predefined altitude of the aircraft. At the time or short after the aircraft drops below the minimum predefined altitude, the emergency navigational system will determine that an emergency situation exists, thereby causing the emergency navigational system to immediately take full or partial control of the aircraft, or take full or partial control of the aircraft at some predefined time after the aircraft has continuously maintained an altitude that is below the predefined minimum altitude of the aircraft at a particular flight point.

As illustrated in FIGS. 1-3, the emergency navigational system monitors and/or determines the actual altitude of the aircraft and compares the actual altitude of the aircraft to predefined altitude data for the aircraft. As can be appreciated, other and/or additional parameters can be simultaneously monitored and/or obtained and then compared, and/or sequentially monitored and/or obtained and then compared. As stated above, such parameters can include, but are not limited to, flight path (e.g. latitude position, longitude position, LAN position, GPS position), airspeed, aircraft orientation, etc.

Figure 4:
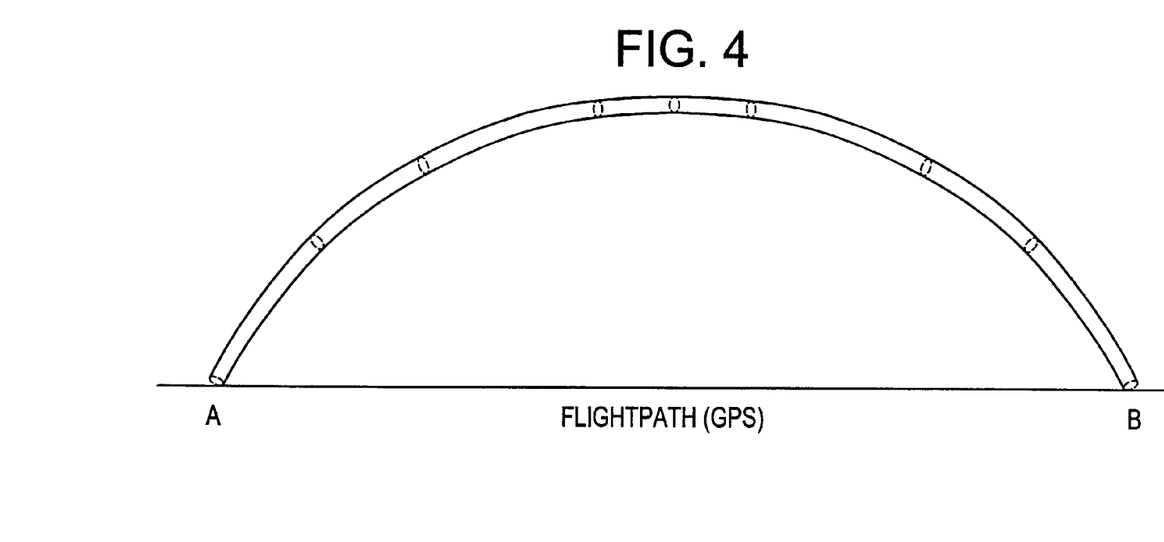
FIG. 4 is a graphical representation of an acceptable three-dimensional flight path of an aircraft.
Figure 5:
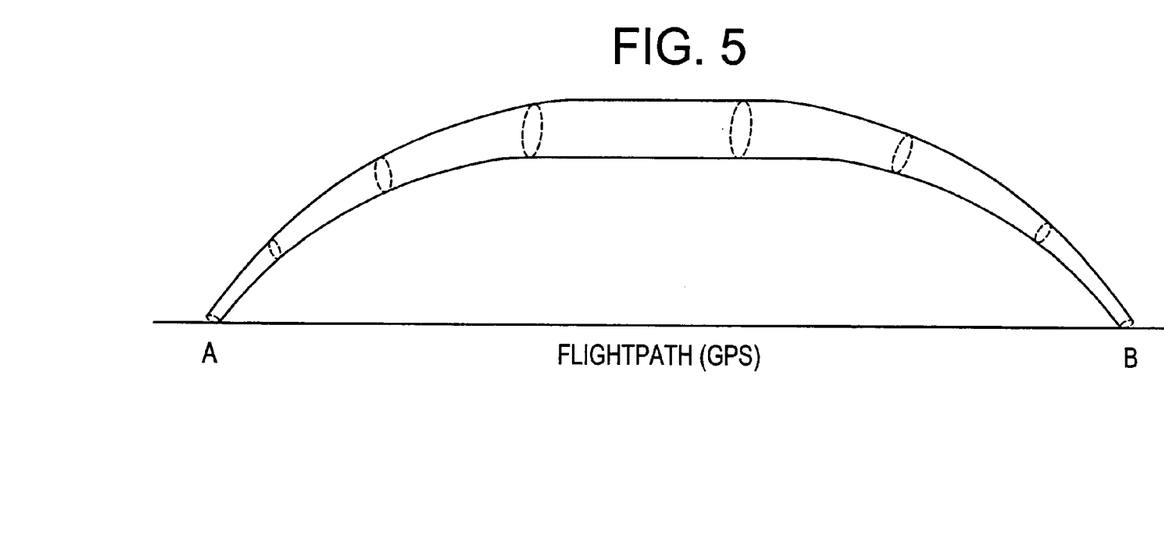
FIG. 5 is a graphical representation similar to FIG. 4 but illustrating that the acceptable three-dimensional flight path varies along the flight path.
Figure 6:
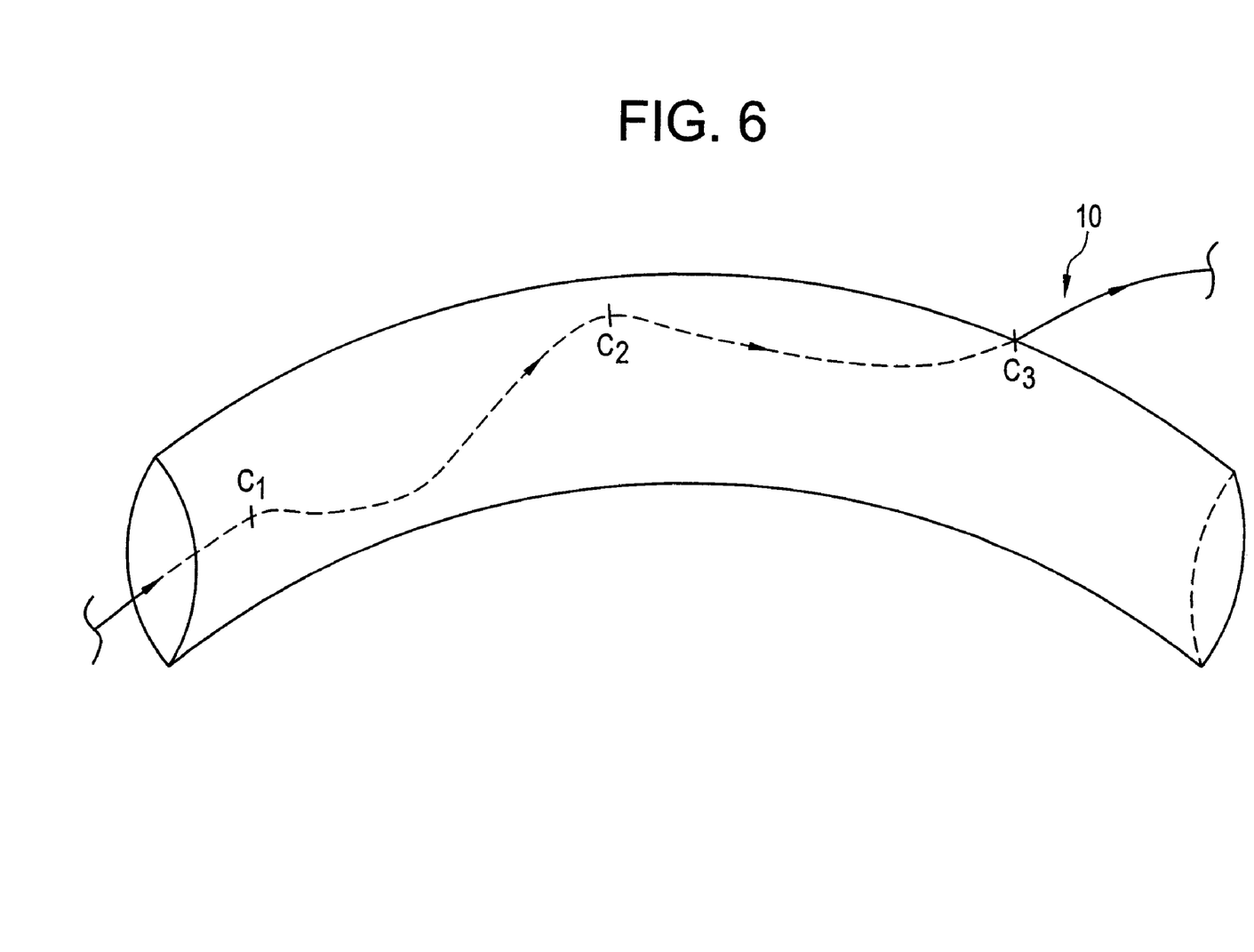
FIG. 6 is a graphical representation of an acceptable three-dimensional flight path during a portion of the flight path of an aircraft and a representation of the actual flight path of the aircraft in such portion of the flight path; and, FIG. 7 is a representation of a flight path of an aircraft prior to and after the emergency navigational system has taken full or partial navigational control of the aircraft.

Referring now to FIGS. 4-6, there is provided a graphical representation of the predefined GPS flight path data for a particular flight path of an aircraft between origination point A and destination point B. As shown in FIG. 4, the acceptable deviation of the predefined GPS data for the flight path is substantially constant from point A to point B. In FIG. 5, the predefined GPS positioning data of the aircraft from point A to point B is variable during the flight path. In both FIGS. 4 and 5, the predefined GPS flight path data forms an acceptable space wherein the aircraft can fly, which space can be thought of as a tube of acceptable flight space. This tube can be best visualized in FIG. 6, which is representative of a section of the flight path of FIG. 4. As shown in FIG. 6, the tube-shaped section is defined by the predefined GPS data in the database of the emergency navigational system. Superimposed on the GPS flight path tube is the actual flight path 10 of an aircraft. As shown in FIG. 6, so long as the actual GPS position of the aircraft falls within this predefined GPS flight path tube, the emergency navigational system will not determine the existence of an emergency situation. Consequently, the determined or obtained GPS positions $C_1$ and $C_2$ fall within the acceptable predefined flight path or space of the aircraft, thus the emergency navigational system will not determine that an emergency situation exists. Position $C_2$ is located close to the outer perimeter of the acceptable predefined flight path or space, thus the emergency navigational system can internally designate this instance as a possible warning and/or provide an actual warning to the pilot and/or other authorized personnel that the aircraft is approaching the outer perimeter of the acceptable predefined flight path. As shown in the latter part of the flight path $C_3$ of the aircraft of FIG. 6, the aircraft deviates outside of the predefined GPS flight path tube, thereby causing the emergency navigational system to determine an emergency situation resulting in immediate or subsequent partial or full control of the navigational systems of the aircraft.

Figure 7:
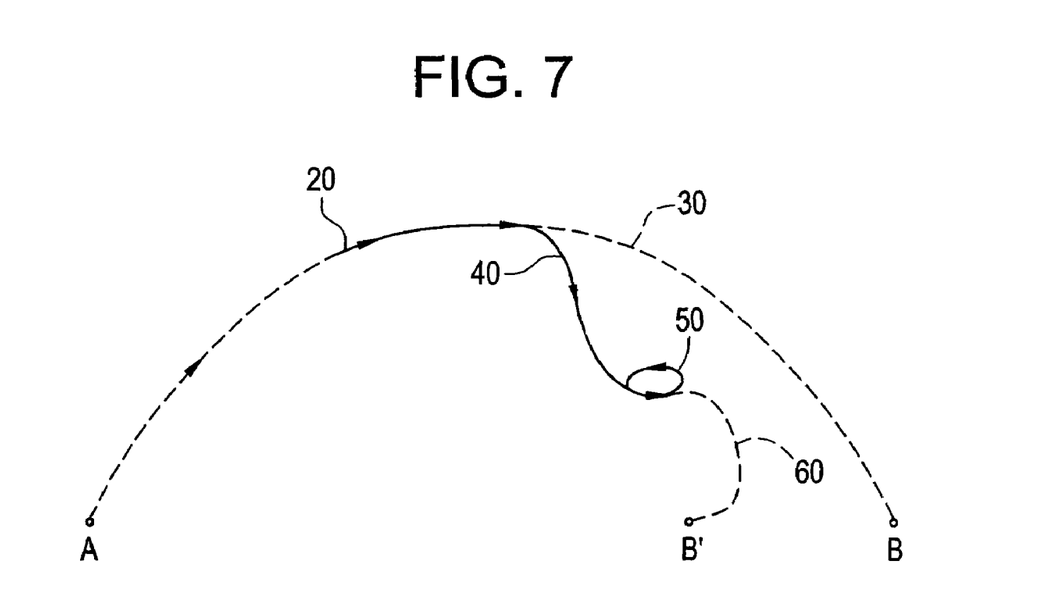

Referring now to FIG. 7, there is illustrated in a solid line 20 that represents the actual flight path of an aircraft which takes off from destination A and initially travels toward destination B. As illustrated in FIG. 7, about halfway between destination A and B, the emergency navigational system partially or fully takes control of the navigation of the aircraft for one or more reasons. Once the emergency navigational system takes full or partial control of the aircraft, the emergency navigational system can attempt to navigate the aircraft along the predefined flight data which is stored in the database of the navigational system, as illustrated in the dotted line 30 to destination B, or the emergency navigational system can initiate a new predefined emergency flight path, as illustrated by the bold line 40 in FIG. 7. This new predefined flight path can be standardized for the aircraft or can be specific to the type of aircraft, the location of the aircraft, and/or can be dependent upon other parameters existing at the time that the emergency navigational system takes full or partial navigational control of the aircraft. As illustrated in FIG. 7, the emergency navigational system causes the aircraft to enter a new predefined flight path 40 thereby causing the aircraft to initially reduce in altitude after partially or fully taking navigational control of the aircraft, and then causes the aircraft to fly to a predefined location and thereafter enter into a holding pattern 50, as illustrated in the circular pattern of FIG. 7. At the time the emergency navigational system enters this predefined flight path, the airspeed of the aircraft can be reduced, fuel can be partially dumped, and/or other measures can be initiated to minimize the risk of the aircraft to the passengers on board the aircraft and/or the public at large. As shown by the dotted line 60 extending from holding pattern 50 in FIG. 7, the aircraft subsequently lands at a destination B', which is different from the original destination B. Destination B' can be a preprogrammed destination which is included in the emergency navigational system, or can be information that is subsequently inputted into the database of the emergency navigational system by the pilot and/or authorized personnel on the aircraft, and/or from a position remote to the aircraft. The landing of the aircraft at destination B' can be accomplished by the pilot and/or other authorized personnel on the aircraft, by the emergency navigational system, or from a remote location. FIG. 7 is representative of a situation wherein the pilot loses control of the aircraft during the flight of the aircraft (e.g. illness, hijacking, etc.), and wherein such loss of control results in the aircraft deviating from the predefined flight parameters which were programmed in the database of the emergency navigational system. As illustrated in FIG. 7, the emergency navigational system, upon partially or fully gaining navigational control of the aircraft, causes the aircraft to reduce in altitude and fly to a predefined flight location and enter into a holding pattern 50. Upon entering into the holding pattern, the aircraft remains in such holding pattern until it is determined that the pilot and/or other authorized personnel on the aircraft can properly regain control of the aircraft to safely land the aircraft, and/or it is determined that the aircraft needs to be automatically or remotely landed. If it is determined that the pilot and/or authorized personnel are in proper condition to land the aircraft, the pilot and/or authorized personnel can unilaterally fully or partially disengage control of the aircraft from the emergency navigational system, and/or such control can be partially or fully released from a location remote to the aircraft. Once the pilot has regained full or partial control of the aircraft, the pilot can then land the aircraft at destination B' or destination B. Alternatively, if it is determined that the pilot and/or authorized personnel on the aircraft cannot land the aircraft, the emergency navigational system can automatically cause the aircraft to land at destination B' or destination B, and/or the emergency navigational system can be signaled from a location remote to the aircraft to land the aircraft at destination B' or destination B. If the emergency navigational system does not include data required to land the aircraft at destination B' or destination B, such data can be remotely transmitted to the emergency navigational system to enable the emergency navigational system to land the aircraft at destination B' or destination B. Alternatively, the emergency navigational system can be signaled to allow the aircraft to be landed by remote control from a location remote to the aircraft. In each of these situations, the emergency navigational system facilitates in ensuring that, after encountering an emergency situation, the aircraft is entered into a flight path that minimizes the danger to the passengers and crew on the aircraft and/or minimizes damages and danger to individuals in other facilities that could be threatened by an aircraft during the emergency situation.

The invention has been described with reference to the preferred embodiments. These and other modifications of the preferred embodiments as well as other embodiments of the invention will be obvious from the disclosure herein, whereby the foregoing descriptive matter is to be interpreted merely as illustrative of the invention and not as a limitation. It is intended to include all such modifications and alterations insofar as they come within the scope of the appended claims.

I claim:

1. An emergency navigational system that at least partially controls the navigation of an aircraft comprising a comparator device that compares actual flight parameter data at a particular time, at a particular location, or combinations thereof to predefined flight parameter data for said particular time, said particular location, or combinations thereof, and a navigational controller that takes control of at least one navigational control of said aircraft after said data compared by said comparator deviates beyond a predefined value.

2. The emergency navigational system as defined in claim 1, wherein said actual flight parameter data includes data selected from the group consisting of GPS position data, airspeed, altitude, date, time, aircraft flap position, aircraft orientation, and combinations thereof.

3. The emergency navigational system as defined in claim 1, wherein said predefined flight parameter data includes data selected from the group consisting of GPS position data, airspeed, altitude, date, time, aircraft flap position, aircraft orientation, and combinations thereof.

4. The emergency navigational system as defined in claim 1, wherein said navigational controller controls at least one navigational control to at least partially cause said aircraft to at least temporarily cease deviating beyond said predefined value.

5. The emergency navigational system as defined in claim 1, wherein said navigational controller controls at least one navigational control to at least partially cause said aircraft to at least temporarily follow a new preprogrammed flight path.

6. The emergency navigational system as defined in claim 1, wherein said navigational controller releases control of said at least one navigational control after receipt of a release signal from a security controller.

7. The emergency navigational system as defined in claim 6, wherein said release signal at least partially originates from a location remote to said aircraft.

8. The emergency navigational system as defined in claim 6, wherein said release signal at least partially originates from said aircraft.

9. The emergency navigational system as defined in claim 1, including a database that at least partially stores said predefined flight parameter data prior to flight of said aircraft.

10. The emergency navigational system as defined in claim 9, wherein said database is at least partially removable from said aircraft.

11. The emergency navigational system as defined in claim 1, including an aircraft regulator that limits operation of at least one aircraft device on said aircraft while said navigational controller is controlling at least one of said navigational controls, said aircraft device including an aircraft door, an aircraft hatch, aircraft elevators, aircraft lights, aircraft electronic systems, aircraft environmental controls, and combinations thereof.

12. The emergency navigational system as defined in claim 1, wherein said navigational control includes control of aircraft rudder, aircraft flap, landing gear, aircraft speed, exterior lighting, aircraft engine operation, aircraft fuel control, and combinations thereof.

13. The emergency navigational system as defined in claim 1, wherein at least a portion of said emergency navigational system is located in a cockpit of said aircraft and at least a portion of said emergency navigational system is located remotely of said cockpit, said portion of said emergency navigational system located in said remote location from the cockpit having sufficient components, sufficient predefined flight parameter data, or combinations thereof control said aircraft.

14. The emergency navigational system as defined in claim 1, including a secondary emergency navigational system that at least partially performs at least one function of said emergency navigational system when at least one function of said emergency navigational system fails.

15. The emergency navigational system as defined in claim 14, wherein at least a portion of said secondary emergency navigational system is positioned in a location remote of said cockpit.

16. The emergency navigational system as defined in claim 1, including a security analyzer to verify signals to said emergency navigational system from a location remote to said aircraft.

17. The emergency navigational system as defined in claim 1, wherein said predefined value is constant for at least one flight parameter.

18. The emergency navigational system as defined in claim 1, wherein said defined predefined value is not constant for at least one flight parameter.

19. The emergency navigational system as defined in claim 1, wherein said navigational controller takes control of said at least one navigational control after said compared data has remained beyond said predefined value for a predetermined amount of time.

20. The emergency navigational system as defined in claim 1, including a transmitter that transmits real time navigational data of said aircraft to a location remote of said aircraft during the time said navigational controller controls at least one of said navigational controls.

21. The emergency navigational system as defined in claim 1, including a fuel controller to at least partially expel fuel from said aircraft after said navigational controller controls at least one of said navigational controls.

22. The method of at least partially controlling an aircraft that has deviated from at least one predefined flight parameter comprising:
   a. including at least one predefined flight parameter for at least a portion of a flight path of said aircraft into a database, said predefined flight parameter corresnonding to a particular location, to a particular time, or combinations thereof;
   b. monitoring at least one flight parameter during the flight of said aircraft which corresponds to said at least one predefined flight parameter;
   c. comparing said at least one predefined flight parameter to said corresponding monitored flight parameter; and,
   d. causing an emergency navigational system to activate a navigational controller after determining said monitored flight parameter exceeds a predefined deviation from said predefined flight parameter, said navigational controller at least partially controlling the navigation of said aircraft after being activated.

23. The method as defined in claim 22, wherein said monitored flight parameter data includes data selected from the group consisting of GPS position data, airspeed, altitude, date, time, aircraft flap position, aircraft orientation, and combinations thereof.

24. The method as defined in claim 22, wherein said predefined flight parameter data includes data selected from the group consisting of GPS position data, airspeed, altitude, date, time, aircraft flap position, aircraft orientation, and combinations thereof.

25. The method as defined in claim 22, wherein said navigational controller controls at least one navigational control to at least partially cause said aircraft to at least temporarily cease deviating beyond said predefined deviation.

26. The method as defined in claim 22, wherein said navigational controller controls at least one navigational control to at least partially cause said aircraft to at least temporarily follow a new preprogrammed path.

27. The method as defined in claim 22, wherein said navigational controller releases control of said at least one navigational control after receipt of a release signal from a security controller.

28. The method as defined in claim 27, wherein said release signal at least partially originates from a location remote to said aircraft.

29. The method as defined in claim 27, wherein said release signal at least partially originates from said aircraft.

30. The method as defined in claim 22, including a database that at least partially stores said predefined flight parameter data prior to flight of said aircraft.

31. The method as defined in claim 30, wherein said database is at least partially removable from said aircraft.

32. The method as defined in claim 22, including an aircraft regulator that limits operation of at least one aircraft device on said aircraft while said navigational controller is controlling at least one of said navigational controls, said aircraft device including an aircraft door, an aircraft hatch, aircraft elevators, aircraft lights, aircraft electronic systems, aircraft environmental controls, and combinations thereof.

33. The method as defined in claim 22, wherein said navigational control includes control of aircraft rudder, aircraft flap, landing gear, aircraft speed, exterior lighting, aircraft engine operation, aircraft fuel control, and combinations thereof.

34. The method as defined in claim 22, wherein at least a portion of said emergency navigational system is located in a cockpit of said aircraft and at least a portion of said emergency navigational system is located remotely of said cockpit, said portion of said emergency navigational system located in said remote location from the cockpit having sufficient components, sufficient predefined flight parameter data, or combinations thereof to control said aircraft.

35. The method as defined in claim 22, including a secondary emergency navigational system that at least partially performs at least one function of said emergency navigational system when at least one function of said emergency navigational system fails.

36. The method as defined in claim 35, wherein at least a portion of said secondary emergency navigational system is positioned in a location remote of said cockpit.

37. The method as defined in claim 22, including a security analyzer to verify signals to said emergency navigational system from a location remote to said aircraft.

38. The method as defined in claim 22, wherein said predefined deviation is constant for at least one flight parameter.

39. The method as defined in claim 22, wherein said predefined deviation is not constant for at least one flight parameter.

40. The method as defined in claim 22, wherein said navigational controller takes control of said at least one navigational control after said compared data has remained beyond said predefined deviation for a predetermined amount of time.

41. The method as defined in claim 22, including a transmitter that transmits real time navigational data of said aircraft to a location remote of said aircraft during the time said navigational controller controls at least one of said navigational controls.

42. The method as defined in claim 22, including a fuel controller to at least partially expel fuel from said aircraft after said navigational controller controls at least one of said navigational controls.

\* \* \* \* \*